United States Patent [19]
Jackson

[11] 3,844,361
[45] Oct. 29, 1974

[54] CLOSED CIRCUIT METHOD OF CIRCULATING A SUBSTANTIALLY SOLID FREE DRILLING FLUID

[76] Inventor: Jack M. Jackson, 4518 Willowbend Blvd., Houston, Tex. 77035

[22] Filed: Apr. 19, 1973

[21] Appl. No.: 352,527

Related U.S. Application Data

[62] Division of Ser. No. 101,177, Dec. 23, 1970, abandoned.

[52] U.S. Cl. ............................................. 175/66
[51] Int. Cl. ......................................... E21b 21/04
[58] Field of Search ............ 175/65, 66; 252/8.5 A, 252/8.5 C, 8.5 M, 8.5 P

[56] References Cited
UNITED STATES PATENTS

| | | | |
|---|---|---|---|
| 2,570,947 | 10/1951 | Himel et al. | 252/8.5 C |
| 2,800,449 | 7/1957 | Browning | 252/8.5 A |
| 2,919,898 | 1/1960 | Marwil et al. | 175/66 |
| 2,941,783 | 6/1960 | Stinson | 175/66 X |
| 3,017,351 | 1/1962 | Scott, Jr. et al. | 252/8.5 C |
| 3,040,821 | 6/1962 | Widess | 175/66 |
| 3,081,260 | 3/1963 | Park | 252/8.5 C |
| 3,140,747 | 7/1964 | Mitacek | 175/66 |
| 3,289,775 | 12/1966 | Stone | 175/66 |
| 3,338,320 | 8/1967 | Gilson et al. | 175/65 |
| 3,692,125 | 9/1972 | Ruhle | 175/65 |

*Primary Examiner*—Stephen J. Novosad
*Attorney, Agent, or Firm*—Kenneth H. Johnson

[57] ABSTRACT

The basic fluid is water, oil or an oil-water mixture. The primary weighting materials are dissolved salts, e.g., sodium chloride, calcium chloride or mixed brines, and in these the calcium or sodium ions inhibit hydration and swelling of drilled solids. When noncationic fluids are used, an inhibitor is added to prevent such hydration and disintegration — an electrolyte or a cationic surfactant. Any viscosifier added is one having neither a structured viscosity nor gel strength, hydroxyethyl cellulose, for example. When the drilling fluid is pumped to the surface, most of the drilled solids are in their original condition and size and are readily removed and discarded by screening and other available physical means. There is none of the build-up of solids associated with older systems and, hence, no need for discarding, thinning, and make-up.

9 Claims, No Drawings

CLOSED CIRCUIT METHOD OF CIRCULATING A SUBSTANTIALLY SOLID FREE DRILLING FLUID

This application is a division of Ser. No. 101,177 filed Dec. 23, 1970, now abandoned.

The present invention lies in the field of drilling fluids or muds used in forming wellbores in the earth for the production of oil, gas, water and other minerals. More specifically, the invention applies to a method of formulating such a drilling fluid so that it can be continuously circulated down through the hollow drill string to pick up the cuttings formed by the drill bit, carry them to the surface in the annulus surrounding the bit, and pass them through a series of mechanical devices and settling tanks to remove the drilled solids and return the drilling fluid to the drill string for recirculation — with essentially no loss of either vehicle or additives. Even more specifically, the invention discloses drilling muds eliminating or substantially reducing many of the adjustment steps necessary with prior art muds — discarding a portion of an overladen mud, diluting the retained fraction, and making up to original composition by adding various constituents.

In the prior art of formulating drilling fluids, whether the fluid is to be circulated as in rotary drilling or placed in the bottom of the bore hole as in cable tool drilling, a clay such as bentonite is usually added to water to prepare an aqueous mud. In other cases drilled shales are allowed to accumulate in the mud as drilling progresses in order to build up such properties as weight, viscosity and gel strength. Sometimes muds with oil as the continuous phase are used to prevent hole problems, and in other cases flocculants are added to aqueous mud to aid in dropping out solids at the surface.

The result of using such a clay-based mud system has been a build-up of undesirable solids, either in the circulating mud or in the form of excess mud which is stored in reserve or disposal pits. This build-up, if not properly dealt with, will cause increases in unit weight (specific gravity), viscosity and gel strength to such high levels that a number of undesirable events may occur.

The mud cake on the wellbore wall may become so thick that swabbing occurs in pulling the bit, causing sloughing or caving of the wall and further increases in viscosity and gel strength. Gas bubbles from a drilled formation may become trapped in the mud. Drilling rate may decrease because of the thick filter cake on bottom. The fluid may even become so thick as to be unpumpable.

To avoid such dire results, mud engineers keep a close watch on the circulating mud and take many preventive steps, all rather expensive. Flocculants are added in the settling of pits in attempts to bring about agglomeration and settling of the hydrated and dispersed drilled solids, a step likely to remove some of the originally added bentonite as well. A fraction of the mud is discarded or laid aside, and the balance is thinned to the desired unit weight with water. Of course, in so thinning the concentrations of some if not all constituents of the mud will be reduced below the desired levels. The only recourse available to the mud engineer is to add more of the very materials he has just thrown out in the discarded fraction — primarily bentonite, but also many of the other additives he may be using for fluid loss control and various other properties.

It is the primary object of the present invention to reduce for the operator the cost of the drilling fluid he circulates in his well, and to do this by constantly recirculating the same fluid, discarding virtually nothing but the drilled solids. (Mud must be added with increasing depth, of course, and various changes in the composition of the mud must be made for changes encountered in the formation being drilled, e.g., permeability and formation fluids, but these must be made in any event.)

A second object is to furnish such a drilling fluid having neither gel strength nor structured viscosity, so that drilled solids are readily separable from the drilling fluid at the surface by one or both screening and settling from quiescent drilling fluid.

A third object is to furnish such a drilling fluid which is inhibited against hydration and disintegration of formation solids, either because an oil is used as part of the mud or because an inhibitor is added to a water phase.

A fourth object is to furnish a drilling fluid which enables the driller to obtain higher drilling rates than with clay muds.

A fifth object is to supply a drilling fluid having no tendency to build a thick filter cake on the borewall. Expressed positively, this object is to furnish a drilling fluid which forms a coating, rather than a cake, on the borewall.

A sixth object is to provide a drilling fluid having a filtrate inhibited against hydration and swelling of drilled clays, to avoid hole trouble which may be caused by sloughing clays or heaving shales.

A seventh object is a drilling fluid which reduces the re-startup load on mud pumps after a period of time in which a quiescent column of drilling fluid has been sitting in a wellbore.

An eighth object is a drilling fluid which will permit ready escape of any gas intruding into the fluid during its passage through the wellbore.

The above and other objects are accomplished according to the present invention by the use of a closed circuit mud system wherein the base fluid is an inhibited brine which can be reused indefinitely by disposing of the drilled solids in essentially a dry state. In order to effectively maintain a closed circuit mud system, several conditions must be satisfied, and these may be summarized as follows:

1. The mud must be conditioned so that the drilled solids do not hydrate and then swell or disintegrate into the mud system. Conditioning may be accomplished in various ways, such as adding electrolytes to water. The addition of cationic surfactants to water is also effective as they will be substantive to the cuttings and coat them with a water repelling layer of chemical. Emulsions of water in oil are also effective as the cuttings will not hydrate in oil.

2. The mud must have neither thixotropic properties nor a structured type viscosity, as separation of the cuttings at the surface would be greatly hindered. Thixotropy is also termed gel strength, and is a reversible gel wherein structure builds up when the mud is quiescent and then breaks back down when the gelled fluid is agitated. A structured type viscosity is one wherein viscosity is primarily obtained by physical rather than physico-chemical means. Asbestos and attapulgite are examples of these type materials, each being structured as needles or filaments lacking the chemically active surface groups that characterize, for example, filaments of hydroxyethyl cellulose (HEC). Their viscosities are characterized by high flat gel strengths, i.e., there is little change in viscosity when agitated and initial gel strength is high and constant over a period of time.

3. The mud must supply the properties needed for drilling. Some of these properties are carrying capacity, so that cuttings can be removed from the borehole, fluid loss control so that the borehole itself will be stabilized while drilling, and sufficient density to keep formation fluids out of the well during drilling.

As an example of a mud satisfying these conditions, a trouble-free well was recently drilled in England using one of the low-cost mud systems of the present invention. This was Walton No. 1 Well, in Yorkshire, where Home Oil Company Ltd. of Calgary, Alberta, Canada was the operator. This mud system was prepared with calcium chloride brine as the base fluid. The cuttings-carrying ability of this brine was increased by adding the "Bex" viscosifier of Chemical Additives Company at the rate of 1½ pounds per barrel of mud, this material having as its active ingredient hydroxyethyl cellulose (HEC) in the ratio of about 50–75 percent by weight. HEC can be used by itself, but is more readily and completely utilized when added with the activator used in the "Bex" viscosifier, e.g., finely divided magnesia. For details see the disclosure of the copending application Ser. No. 101,123 of the same inventor, filed Dec. 23, 1970, now abandoned, which is hereby incorporated herein by reference.

To control fluid loss, a calcium lignosulfonate was added at the rate of about 5 pounds per barrel. This was in the form of "Brigeheal" fluid loss additive, again a product of Chemical Additives Company. It contains some finely divided magnesia and some inert calcium carbonate particles and is not reactive with those constituents of the present invention which limit the viscosity of the mud to a no gel strength and no structured viscosity system and inhibit the drilling fluid against hydration and swelling of drilled solids. It may be replaced by other fluid loss additives, when any such additive is necessary, which are non-reactive and do not so affect viscosity and hydration. For details see the aforementioned copending patent application.

The major portion of the cuttings from this well were removed by shaker screens. All cuttings and drilled solids were hauled away from the well site in an essentially dry state, i.e., they had not hydrated. Only a small portion of the drilled cuttings from this operation became entrained in the mud, and said entrainment was attributed to some unavoidable abrasion by the pump and bit. A desander and centrifuge were used to remove most of these entrained solids, and the balance, along with the concomitant calcium chloride, were allowed to rest in a settling pit. The solids settled out and the supernatant clear calcium chloride brine was pumped back into the circulating mud system. A typical set of mud properties, as freshly mixed, was as follows:

| | |
|---|---|
| Weight | 10.8 pounds per gallon |
| Viscosity | 36 seconds by Marsh Funnel Viscosimeter |
| | 6 cp plastic viscosity |
| | 3 cp yield point |
| Gel strength | zero or 0/0 gels |

To have properties of inhibition, a base fluid should be a. Primarily oil, as in a water-in-oil emulsion, or
b. Aqueous with one of the following:
   600 parts per million (ppm) calcium or other divalent cation
   200 ppm aluminum or other trivalent cation, e.g., chromium
   1,500 ppm potassium chloride
   5,000 ppm sodium chloride
   200 ppm of a cationic surfactant such as coco amine or a quatenary ammonium compound.

Various combinations of these salts and cations may also be used with good results.

The above example is intended to be only illustrative, of course. Viscosity without structure or thixotropy may be obtained easily through the use of various gums or polymers known to furnish aqueous fluids the property of pseudoplasticity, or through the use of emulsions of either water-in-oil or oil-in-water or through the use of solutions such as sugar in water. It will be apparent, of course, that the calcium brine may be an aqueous solution of any of a number of other cationic salts and mixtures of such salts; sodium chloride may be used when a lower unit weight is acceptable, and zinc chloride may be used to make the brine when a very heavy mud is required. The salt not only furnishes the weighting material (which does not tend to precipitate when the mud is quiescent), but also typically furnishes the cations for inhibiting the mud against hydration of solid material.

What is claimed is:

1. A closed circuit method of circulating a substantially solid free drilling fluid comprising (1) formulating a drilling fluid based on water, including an additive to inhibit drilled solids from disintegrating, water soluble weighting agents and a viscosifier consisting of material having no gel strength and no structured viscosity, (2) pumping said drilling fluid down the wellbore through the drilling string and bit and back up to the surface in the annulus surrounding the bit and drill string, (3) screening the drilling fluid to separate out and discard the coarse particles (4) removing the major portion of sand silt and other particles from said drilling fluid by settling and decantation, (5) removing the solids remaining in said drilling fluid by mechanical means and, (6) returning the cleaned-up substantially solid free drilling fluid to the wellbore.

2. The closed circuit method according to claim 1 wherein said drilling fluid comprises a brine.

3. The closed circuit method according to claim 2 wherein said brine is a calcium chloride brine.

4. The closed circuit method according to claim 3 wherein a clear supernatant calcium chloride brine is returned to the wellbore in step 6.

5. The closed circuit method according to claim 3 wherein gum or polymer viscosifiers are employed.

6. The closed circuit method according to claim 1 wherein one major portion of any cuttings are removed by shaker screens.

7. The closed circuit method according to claim 6 wherein sand, silt and other particles are removed by desander and centrifuge.

8. The closed circuit method according to claim 1 wherein a clear drilling fluid is returned to the wellbore in step 6.

9. A closed circuit method of circulating a substantially solid free drilling fluid comprising (1) formulating a drilling fluid based on water and containing therein an additive to inhibit drilled solids from disintegrating, water soluble inorganic salt weighting agents and a viscosifier having no gel strength and no structured viscosity and comprising hydroxyethyl cellulose, (2) pumping said drilling fluid down the wellbore through the drilling string and bit and back up to the surface in the annulus surrounding the bit and drill string, (3) screening the drilling fluid to separate out and discard the coarse particles, (4) removing the major portion of sand silt and other particles from said drilling fluid by settling and decantation, (5) removing the solids remaining in said drilling fluid by mechanical means and, (6) returning the cleaned-up substantially solid free drilling fluid to the wellbore.

* * * * *